(12) United States Patent
Miyanoo

(10) Patent No.: US 7,594,497 B2
(45) Date of Patent: Sep. 29, 2009

(54) CONTROL DEVICE AND CONTROL METHOD FOR INTERNAL COMBUSTION ENGINE

(75) Inventor: Yuji Miyanoo, Seto (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 222 days.

(21) Appl. No.: 11/909,127

(22) PCT Filed: Dec. 4, 2006

(86) PCT No.: PCT/IB2006/003449

§ 371 (c)(1),
(2), (4) Date: Sep. 19, 2007

(87) PCT Pub. No.: WO2007/069013

PCT Pub. Date: Jun. 21, 2007

(65) Prior Publication Data

US 2008/0190396 A1 Aug. 14, 2008

(30) Foreign Application Priority Data

Dec. 13, 2005 (JP) .............................. 2005-359351

(51) Int. Cl.
*F02P 5/15* (2006.01)
*F01L 1/34* (2006.01)

(52) U.S. Cl. .............................. 123/406.45; 123/90.16; 123/406.29; 123/399

(58) Field of Classification Search .............. 123/90.11, 123/90.15–90.18, 90.27, 90.31, 348, 399, 123/406.11, 406.29, 406.45, 406.52, 406.59; 701/101–103, 110, 111
See application file for complete search history.

(56) References Cited

U.S. PATENT DOCUMENTS 5,143,037 A 9/1992 Sawamoto
6,615,775 B2 * 9/2003 Takemura et al. ......... 123/90.15
6,732,682 B2 * 5/2004 Aoyama et al. ........... 123/48 B
6,772,731 B2 * 8/2004 Miura ......................... 123/399
6,874,472 B2 * 4/2005 Shimizu ................. 123/406.11
7,121,260 B2 * 10/2006 Miyanoo et al. ....... 123/406.45
7,152,560 B2 * 12/2006 Miyanoo et al. ......... 123/90.15
7,168,402 B2 * 1/2007 Takemura et al. ........ 123/90.15
7,426,913 B2 * 9/2008 Arinaga et al. ........... 123/90.16
2004/0055571 A1 3/2004 Hashizume et al.
2005/0205055 A1 9/2005 Shimizu
2005/0257760 A1 * 11/2005 Kato et al. ................ 123/90.16
2006/0016407 A1 * 1/2006 Miyanoo et al. ......... 123/90.15
2006/0107924 A1 * 5/2006 Miyanoo et al. ....... 123/406.45

FOREIGN PATENT DOCUMENTS

EP 1 323 902 A2 7/2003
JP 2001-263015 A 9/2001

* cited by examiner

Primary Examiner—Willis R Wolfe, Jr.
(74) Attorney, Agent, or Firm—Sughrue Mion, PLLC

(57) ABSTRACT

When the engine output request is increased in a state in which the valve closing timing of an intake valve (9) is before intake BDC, a target value (LT) for the maximum lift of an intake valve is changed straight away, regardless of the actual air intake amount, to a value which makes the valve closing timing of the valve become a timing which is after the BDC and is spaced away from the BDC. In this case, by drive controlling a variable valve operating mechanism (14) based upon the target value (LT), the valve closing timing of the intake valve (9) is changed straight away from before the intake BDC to after the intake BDC, which shortens the time period in which, during this changing process, the valve closing timing of the intake valve (9) is present in the vicinity of the intake BDC as much as possible.

5 Claims, 5 Drawing Sheets

CONTROL DEVICE AND CONTROL METHOD FOR INTERNAL COMBUSTION ENGINE

BACKGROUND OF THE INVENTION

1. Field of the Invention

The present invention relates to a control device and a control method for an internal combustion engine.

2. Description of the Related Art

Typically, in an internal combustion engine, such as an automobile engine the timing that yields maximum engine output is set as the ignition timing; and, when knocking occurs, the ignition timing is retarded to lower the temperature of the combustion chamber and suppress knocking.

Furthermore, with an internal combustion engine, as demand for engine output increases, a greater amount of fuel and air must be fed into the combustion chamber in order to fulfill the increased demand. Due to this, the opening amount of a throttle valve, which is provided in the intake passage, is adjusted according to the engine output request to adjust the amount of intake air taken into the internal combustion engine.

However, in recent years, in addition to adjusting the intake air amount by adjusting the opening amount of a throttle valve, the intake air amount is also adjusted by varying the maximum lift and the duration of an intake valve. Japanese Patent Application Publication 2001-263015 describes a mechanism for varying the maximum lift and duration. In the described variable valve operating mechanism, the maximum lift and the duration of the intake valve are varied in mutual synchronization; in other words, increasing the maximum lift of the valve also increases the duration of the valve. With adjustment of the intake air amount by driving the variable valve operating mechanism in this manner, target values for the maximum lift and duration are calculated based upon the amount of the engine output request. The variable valve operating mechanism is driven to bring the maximum lift and the duration towards these target values, and, thereby, the intake air amount is adjusted towards a value that corresponds to the engine output request.

The target values are, for example, increased as the engine output request increases. By changing the maximum lift and duration towards the target values, which vary in this manner, the intake air amount is increased as the engine output request increases. Furthermore, when calculating the target values, not only is the amount of the engine output request taken into account, but also the actual amount of intake air at that time. Due to this, the maximum lift and duration, which are changing towards their target values, are caused to attain appropriate values for obtaining the requested air intake amount.

When adjusting the intake air amount by varying the maximum lift and duration by driving the variable valve operating mechanism, during low load operation when the demand for engine output is small, such as during idling operation or the like, as the maximum lift and the duration decreases, the valve closing timing of the intake valve approaches a timing before the intake bottom dead center ("BDC"). In this state, when the engine output request increases because of acceleration or the like, the target values for the maximum lift and the duration are increased based upon the amount of this engine output request. Since the calculation of the target values is performed by taking into account the actual intake air amount, which increases progressively and gradually, accordingly the target values are gradually increased corresponding to the change of this actual intake air amount. Moreover, by driving the variable valve operating mechanism to gradually increase the maximum lift and the duration to the target values in response to a demand for increased engine output, it is possible to obtain an intake air amount which corresponds to the amount of the engine output request.

However, when the maximum lift and the duration are gradually increased from the low load operational state, along with this increase of the duration, the valve closing timing of the intake valve gradually changes from closing before the intake BDC to closing after the intake BDC. Here, when the intake valve closes at approximately the intake BDC, the actual compression ratio increases, which frequently causes knocking to occur and leads to the retarding of the ignition timing. Accordingly when, along with increase of the duration of the intake valve, the valve closing timing of the intake valve changes gradually from closing before the intake BDC to closing after the intake BDC, there is a high likelihood that knocking will occur, so that the ignition timing is retarded in order to suppress such knocking. Consequently, the increase of the engine output may be delayed, due to the retarding of the ignition timing.

SUMMARY OF THE INVENTION

The object of the present invention is to provide a control device and a control method for an internal combustion engine, which reduces the delay in increasing the output of the engine when, along with increase of the engine output request, the intake air amount is increased by increasing the maximum lift and the duration of the intake valve.

A first aspect of the present invention provides An internal combustion engine control device that suppresses knocking by retarding ignition timing and adjusts an intake air amount by controlling a variable valve operating mechanism, which changes a maximum lift and a duration of an intake valve; the internal combustion engine control device increases a target value for the maximum lift and the duration of the intake valve when increased an output request of the internal combustion engine, based on the amount of the required increased output and an actual air intake amount, and controls the variable valve operating mechanism to increase the maximum lift and the duration of the intake valve to the target value; characterized in that: the target value is changed straight away, regardless of the actual air intake amount, to value which makes the valve closing timing of the intake valve become a timing which is after the bottom dead center and is spaced away from the bottom dead center, when the output request is increased in a state in which the valve closing timing of the intake valve is before the intake bottom dead center.

According to the first embodiment, when the output request of the internal combustion engine is increased under conditions where the intake valve closes before the intake BDC, the target value for the maximum lift and the duration of the intake valve are changed straight away, regardless of the actual air amount, to value where the intake valve closes after the intake BDC and is spaced apart from that BDC. In contrast, the target value for the maximum lift and the duration of the intake valve are conventionally calculated by taking into account the actual air amount; however, because the actual air intake amount increases gradually and progressively, the target value would also be gradually increased, and the maximum lift and the duration of the intake valve would also be increased gradually to the target value. In the process of gradually changing the valve closing timing of the intake valve from closing before the intake BDC to closing after the intake BDC, there is an increased likelihood that knocking may occur due to the high compression ratio. Moreover, by retarding the ignition timing to suppress the knocking, the increase of the power output of the engine may be delayed, to the extent of this retardation of the ignition timing. However, with regard to delay in the increase of the power output of the engine, by changing to the target value straight away, and changing the valve closing timing of the intake valve from closing before the intake BDC to closing after the intake BDC straight away, it is possible to suppress the occurrence of knocking during this change process.

It should be understood that it would also be acceptable to arrange to set, as the value when the target value is changed straight away, i.e., as the valve closing timing of the intake valve is delayed until after the intake BDC and moreover is spaced apart from that BDC, to a value such that, when the maximum lift and the duration of the intake valve have arrived at their target value, the compression ratio is low enough so that knocking is less likely to occur.

According to a second aspect of the present invention, in the first aspect, a throttle valve is provided in an intake passage of the internal combustion engine, and, when the target value is changed straight away to value which make the valve closing timing of the intake valve become a timing which is spaced away from the intake bottom dead center, in addition to changing the maximum lift and the duration of the intake valve towards the target value, adjustment of the intake air amount of the internal combustion engine is performed by adjusting the opening amount of the throttle valve.

When the target value is changed straight away to value where the valve closing timing of the intake valve become a timing which is after the BDC and is spaced away from the BDC, and the maximum lift and the duration of the intake valve are changed according to these target value, then there is the possibility that the intake air amount of the engine may become excessive. However, because the opening amount of the throttle valve is also adjusted when the target value is changed, when the target value is changed straight away as described above, it is possible to adjust the intake air amount to the internal combustion engine so that an excessive amount of air does not enter the engine.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
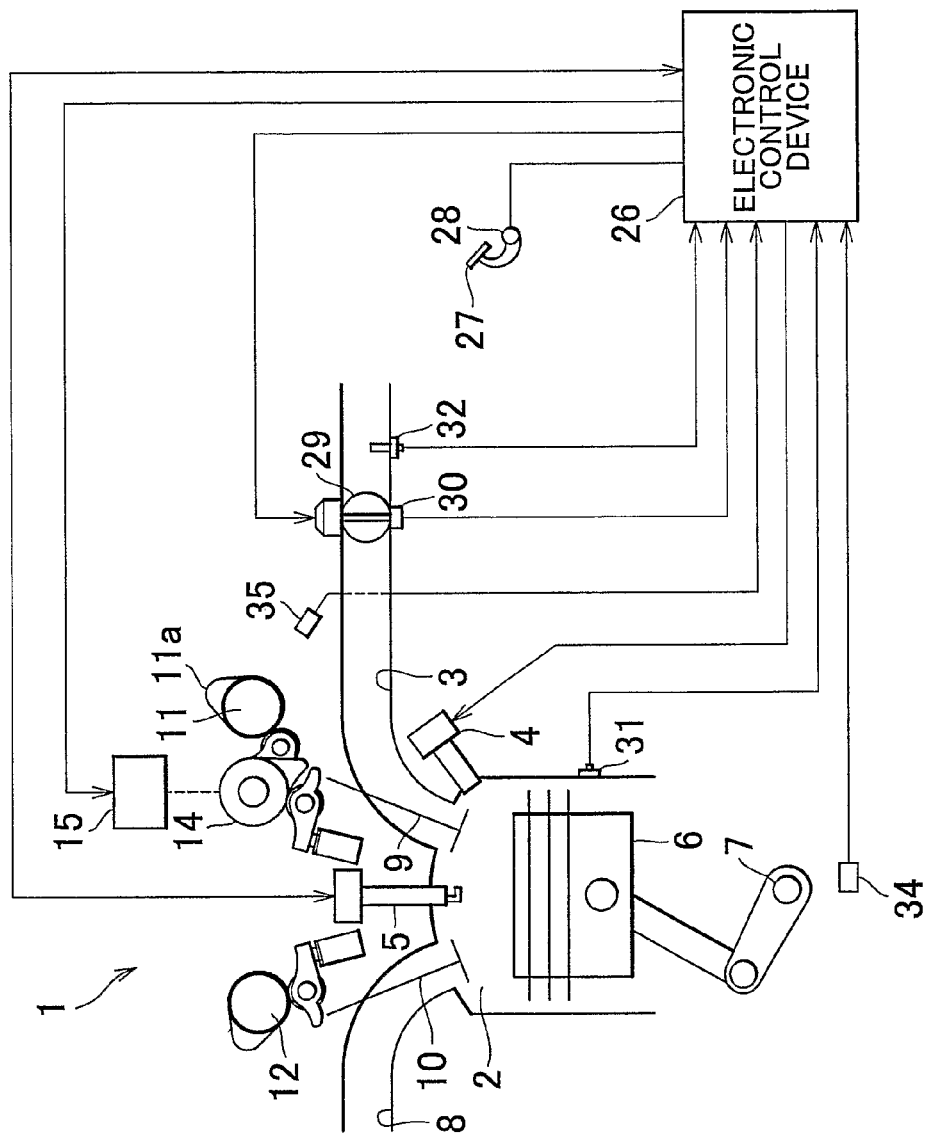
FIG. 1 is a schematic figure showing an overall view of an engine to which the control device of an embodiment of the present invention is applied.

In the following, an embodiment in which the present invention is applied to a spark ignition type engine for an automobile will be explained with reference to FIGS. 1 through 7. In the engine 1 shown in FIG. 1, along with air being taken into the combustion chamber 2 through the intake passage 3, fuel is supplied by direct injection from the fuel injection valve 4. When the mixture consisting of this air and fuel is ignited by a spark plug 5, the mixture combusts, causing the piston 6 to reciprocate, thus rotating the crankshaft 7, which is the output shaft of the engine 1. After the combustion cycle, the mixture gas is expelled from the combustion chamber 2 into an exhaust passage 8.

In the engine 1, the opening and closing operation of an intake valve 9 permits or interrupts communication between the combustion chamber 2 and the intake passage 3. Similarly, the opening and closing operation of the exhaust valve 10 permits or interrupts communication between the combustion chamber 2 and the exhaust passage 8. The intake valve 9 and exhaust valve 10 are opened and closed by the rotation of the intake cam shaft 11 and the exhaust cam shaft 12, respectively, to which the rotation of the crank shaft 7 is transmitted.

Figure 2:
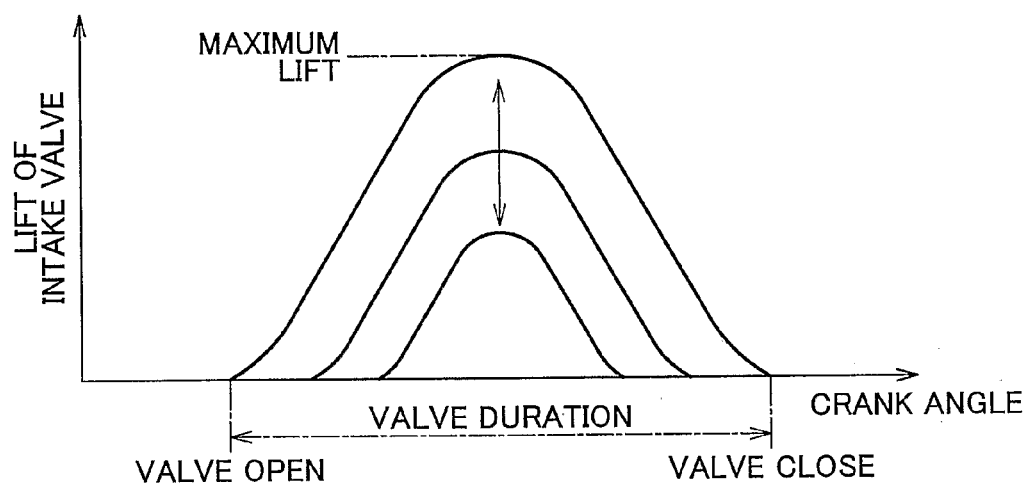
FIG. 2 is a graph showing the mode in which the maximum lift and the duration of an intake valve change, based upon a variable valve operating mechanism.

A variable valve operating mechanism 14 is provided between the intake camshaft 11 and the intake valve 9. The variable valve operating mechanism 14 is driven by an electric motor 15 and varies the maximum lift and the duration of that valve 9 (the degrees of rotation of an intake cam 11a at which the intake valve 9 opens and closes). The mode in which the maximum lift and the duration of the intake valve 9 vary according to this driving by the variable valve operating mechanism 14 is shown in FIG. 2. As will be understood from FIG. 2, the maximum lift and the duration are parameters that change synchronously, thus, for example, as the duration increases, the maximum lift also increases. Generally, increasing the duration means that that the valve closing timing of the intake valve 9 is retarded.

Various types of control for the engine 1 may be implemented by the electronic control unit 26 which is mounted to the automobile. The electronic control unit 26 comprises a CPU which performs calculation processing for controlling the engine 1, a ROM in which programs and data requested for this control are stored, a RAM in which results of calculations are temporarily stored, input and output ports for inputting and outputting signals from and to the exterior, and so on.

Various types of sensors may be connected to the input ports of the electronic control unit 26, such as, an accelerator position sensor 28 which detects the amount by which an accelerator pedal 27 actuated by the driver (i.e., the accelerator operation amount); a throttle position sensor 30 which detects the opening amount of a throttle valve 29 that is provided to the intake passage 3 (i.e., the throttle opening amount); a knock sensor 31 which detects whether knocking is occurring in the engine 1; an air flow meter which detects the amount of air being taken into the combustion chamber 2 via the intake passage 3; a crank position sensor 34, which outputs a signal indicating the rotation of the crank shaft 7 that is used to calculate the engine rotational speed and so on; and a cam position sensor 35 which outputs a signal indicating the rotational positions of the cams. Furthermore, the fuel injection valve 4, the spark plug 5, the electric motor 15, and the throttle valve 29 are connected to the output ports of the electronic control unit 26.

The electronic control unit 26 determines the engine operational state based upon the signals received from the various sensors described above, and, based upon the determined engine operational state, outputs command signals to the various drive circuits that are connected to the output ports. In this manner, control of the fuel injection amount from the fuel injection valve 4, the maximum lift and the duration of the intake valve 9, the opening amount of the throttle valve 29, and the like are implemented via the electronic control unit 26.

The ignition timing control of the engine 1 normally adjusts the ignition timing so that the highest engine output is obtained; but, when knocking occurs, the ignition timing is retarded in order to prevent that knocking. Accordingly, the ignition timing control suppresses the occurrence of knocking, while maintaining the highest possible engine output.

Furthermore, the control of the fuel injection amount of the engine 1 may be implemented by driving the fuel injection valve 4 to inject fuel in an amount that corresponds to the amount of air taken from the intake passage 3 into the combustion chamber 2 in one operational cycle. Due to this, with this engine 1, the greater the intake air amount become, the greater the amount of fuel and air supplied to the combustion chamber become, so that the output of the engine 1 is accordingly increased.

In the engine 1 of this embodiment, the throttle valve 29 is normally kept in the fully opened state, and the intake air amount is adjusted via adjustment of the maximum lift and the duration of the intake valve 9 by driving of the variable valve operating mechanism 14. Accordingly, as the accelerator operation amount increases and the output request of the engine 1 is increased, the maximum lift and duration are also increased, and the intake air amount is increased so that the engine output can satisfy the demand for increased output.

Next, the control of the variable valve operating mechanism 14 for adjusting the intake air amount of the engine 1 will be explained in detail. In the drive control of the variable valve operating mechanism 14, target values for the maximum lift and the maximum duration of the intake valve 9 are used. It should be understood that, since the maximum lift and the maximum duration of the intake valve 9 vary in mutual synchrony as described above, a target value LT for the maximum lift will be used as the target value for controlling the variable valve operating mechanism 14.

The target value LT is calculated based upon the amount of the output request of the engine 1, and, in more concrete terms, it is calculated based upon the amount of the operation amount of the accelerator. That is, the greater the target value LT become, the greater the accelerator operation (i.e., the requested output) amount become. And the variable valve operating mechanism 14 is controlled to make the maximum lift approach this target value LT, which has been calculated in the manner described above. By doing this, it is possible to adjust the maximum lift and the duration of the intake valve 9 to obtain an air intake amount which corresponds to the accelerator operation amount (i.e., the requested output).

Furthermore, when calculating the target value LT, not only the accelerator operation amount at this time (i.e., the requested output) is taken into account, but also the actual intake air amount. By calculating the target value LT while taking the actual intake air amount into account in this manner, the maximum lift, which approaches the target value LT, and the duration synchronously changes therewith, approach values that are appropriate for obtaining the requested intake air amount.

Figure 3:
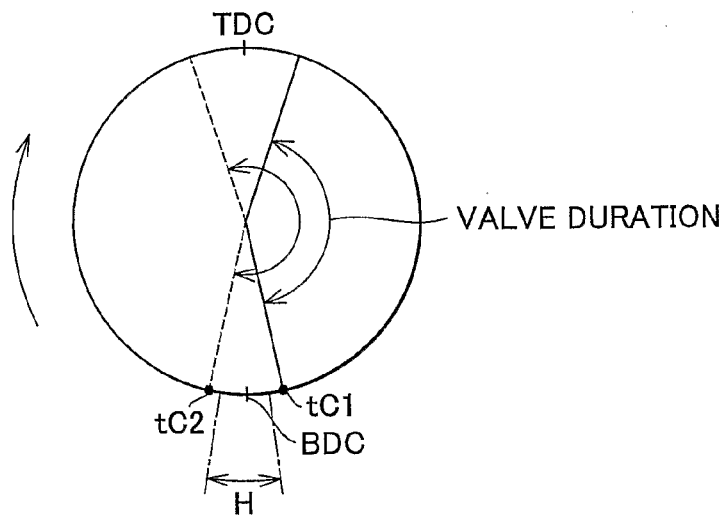
FIG. 3 is an explanatory figure showing the mode in which the intake valve opens.

When the intake air amount is adjusted, by changing the maximum lift and the duration of the intake valve 9 by driving the variable valve operating mechanism 14, during low load operation the engine 1 (i.e., the output request of the engine is small), such as when the engine is idling or the like, because the intake air amount which is requested is small, the target value LT is also set to be small. Accordingly, the maximum lift and the duration of the intake valve also are set to be small. FIG. 3 shows the mode in which the intake valve 9 opens at this time. As will be understood from this figure, along with the reduction of the duration, the valve closing timing of the intake valve 9 is changed to the timing tC1, which is earlier than the intake BDC.

Figure 4A:
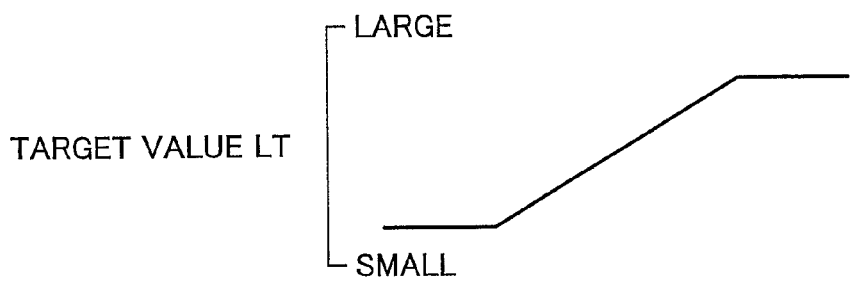
FIGS. 4A and 4B are, respectively, a time chart showing the mode in which a target value LT changes, and a time chart showing the mode in which the valve closing timing of the intake valve changes in accompaniment with change of this target value LT.

When in this state, due to acceleration or the like, the output request of the engine increases, then the target value LT gradually becomes larger, as shown in FIG. 4A, based upon the amount of this requested output and the actual air intake amount, and, according to this target value LT, the variable valve operating mechanism 14 is driven so that the maximum lift and the duration gradually increase. It should be understood that, in this process of increasing the output request of the engine, the reason that the target value LT is increased gradually, is because the increase of the actual air amount with respect to increase of the maximum lift and the duration occurs gradually, and the target value L is calculated while taking this actual air amount into account. By driving the variable valve operating mechanism 14 based upon the target value LT, which is calculated in this manner, in the process of increasing the power output from the engine, it becomes possible to obtain an intake air amount according to the amount of the engine output request.

Figure 4B:
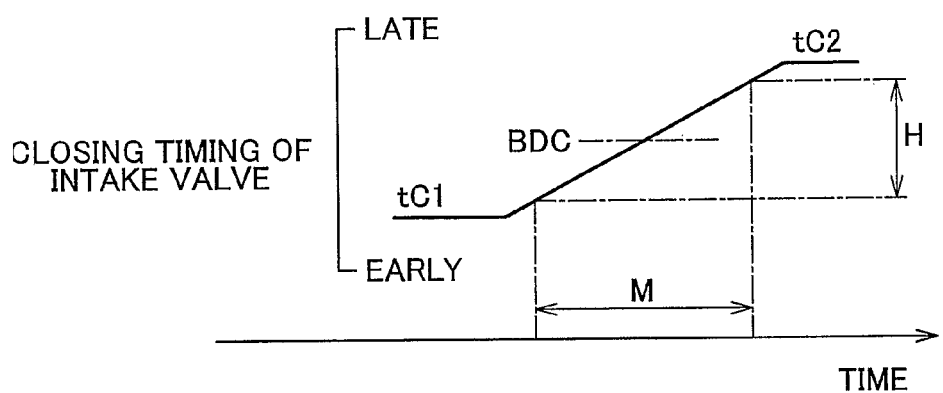

However, when increasing the output request of the engine 1 in the low load operational state, as the maximum lift and the operational angle increase, then the duration is increased, to a state as, for example, shown by the broken lines in FIG. 3, and, along with this, the valve closing timing of the intake valve 9 gradually changes from a timing (tC1) (i.e., closing before the intake BDC) to a timing (tC2) (i.e., closing after the intake BDC), as shown in FIG. 4B. When the valve closing timing of the intake valve 9 is within the range H in the vicinity of the intake BDC, knocking often occurs because the actual compression ratio is higher, which causes the ignition timing to be retarded. Accordingly, as described above, as the duration of the intake valve 9 increases, the valve closing timing of the intake valve 9 gradually changes from a timing (tC1) before the intake BDC to a timing (tC2) after the intake BDC, then the timing period M in which the valve closing timing of the intake valve 9 is present within the range H becomes longer, so that retardation of the ignition timing comes to be frequently performed, in order to suppress knocking in this period M. As a result, it becomes impossible to avoid delaying the increase of the power output of the engine 1, by just the extent due to this ignition timing retardation.

Figure 5:
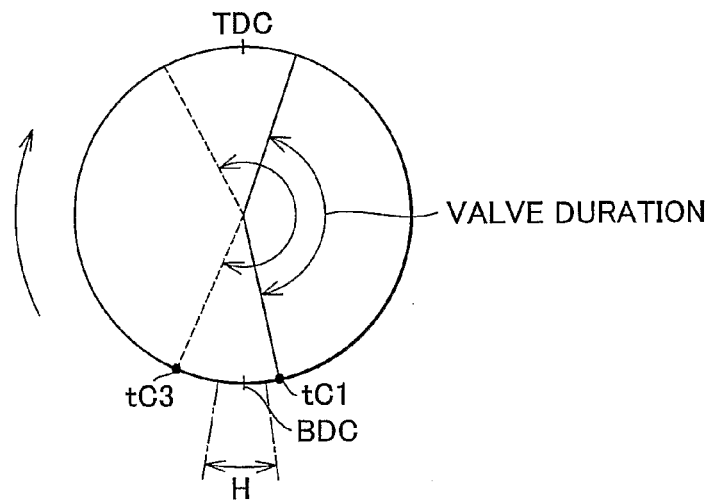
FIG. 5 is an explanatory figure showing the mode in which the intake valve opens.

Thus, in this embodiment, when the output request of the engine 1 is increased in a state in which the valve closing timing of the intake valve 9 is before the intake BDC, then the target value LT is changed straight away, independently of the actual intake air amount, to a value, such as the timing value tC3, shown for example in FIG. 5, at which the valve closing timing of the intake valve 9 is after the intake BDC and moreover is spaced away from the intake BDC. This type of change of the target value LT, and the change of the valve closing timing of the intake valve which accompanies it, are shown in FIG. 6.

Figure 6A:
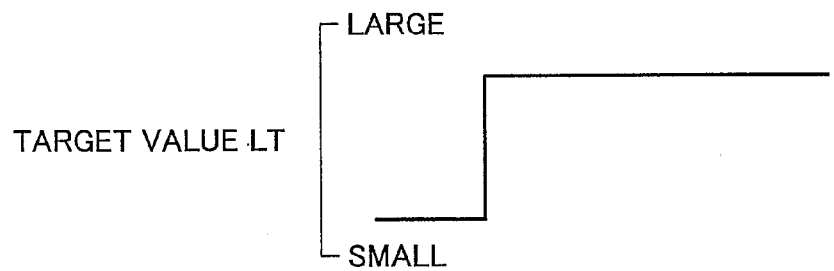
FIGS. 6A and 6B are, respectively, a time chart showing the mode in which the target value LT changes, and a time chart showing the mode in which the valve closing timing of the intake valve changes in accompaniment with change of this target value LT.
Figure 6B:
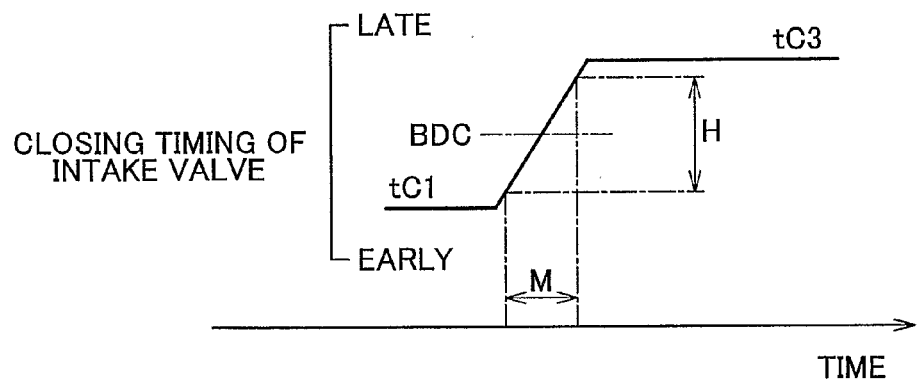

When the target value LT is changed straight away in the manner described above, and transits as shown in FIG. 6A, then the variable valve operating mechanism 14 is driven based upon this target value LT, and the maximum lift approaches the target value LT at the maximum possible speed. As a result, the valve closing timing of the intake valve 9 straight away changes, as shown in FIG. 6B, from the timing (tC1) before the intake BDC to the timing (tC3) after the intake BDC, which reduces the time period M in which the valve closing timing of the intake valve 9 is present within the range H. Accordingly, it is possible to reduce the occurrence of knocking within this time period M, and thus it is possible to suppress delay of the power output increase of the engine 1 due to retardation of the ignition timing to suppress knocking.

Next, the sequence of the procedure for controlling the intake air amount of the engine 1 will be explained with reference to the flow chart of FIG. 7, which shows the intake air amount control routine. This intake air amount control routine is executed by the electronic control unit 26, for example upon timer interrupts every time a predetermined time interval elapses.

In this routine, first, a decision is made (in a step S101) as to whether the value of a flag F, which is for deciding that an increase in the engine output requirement has occurred from a state in which the valve closing timing of the intake valve 9 is before the intake BDC, is zero (i.e. to "no increase"). If the result of this decision is affirmative, then steps S102 and S103 are executed, in order to decide whether the above type of increase in the requested output has occurred. In other words, in the step S102, a decision is made as to whether the valve closing timing of the intake valve 9 is before the intake BDC, for example, whether the intake valve 9 is closing 10° before the BDC. Next, in the step S103, a decision is made as to whether increased output power of the engine 1 is requested, based upon whether or not the accelerator operation amount has increased.

If a negative decision is made in either of steps S102 and S103, then the current situation is not one in which an increase in the output request of the engine 1 has occurred, in a state in which the valve closing timing of the intake valve 9 is before the intake BDC. Thus, normal intake air amount control is performed (in a step S110), in which the target value LT is calculated based upon the amount of the output request of the engine 1 and the actual intake air amount, and the variable valve operating mechanism 14 is drive controlled based upon this target value LT.

On the other hand, if affirmative decisions have been made in both step S102 and step S103, then the current situation is one in which an increase in the output request of the engine 1 has occurred, in a state in which the valve closing timing of the intake valve 9 is before the intake BDC. Then (in a step S104) the flag F is set to 1 (i.e. to "increase"), and a target value LT is set (in a step S105), such that the valve closing timing of the intake valve 9 becomes a timing which is after the intake BDC and moreover is spaced away from that BDC. It should be understood that it would also be acceptable to arrange to set, as the value to which the target value LT is changed straight away in this manner, that is to say, as the value which makes the valve closing timing of the intake valve 9 become separated from the intake BDC, a value such that, when the maximum lift of the intake valve 9 has reached this target value LT, the compression ratio becomes low enough so that knocking is less likely to occur. For example, it would be possible to employ a value such that the valve closing timing of the intake valve 9 becomes 30° after the intake BDC. And, in a step S106, the variable valve operating mechanism 14 is controlled so that the maximum lift approaches at the maximum speed towards the target value LT. To amplify this, this maximum speed is the maximum speed within the range of the normal operation of the variable valve operating mechanism 14.

By controlling the variable valve operating mechanism 14 in this manner, it is possible to shorten the time interval requested for changing the valve closing timing of the intake valve 9 from before the intake BDC to after the intake BDC as much as possible, and thus to ensure that knocking does not occur during this time interval; and it is possible to suppress delay in increase of the power output of the engine 1 which would be caused by retardation of the ignition timing in order to suppress knocking. However, as described above, when the target value LT is changed straight away without taking into account the actual air intake amount, to a value for which the valve closing timing of the intake valve 9 becomes a timing 30° after the intake BDC, and the maximum lift is changed towards this target value LT, there is an increased likelihood that the intake air amount to the engine 1 may become excessive. In order to suppress the excessive intake air amount, in step S107, opening amount of the throttle valve 29 is reduced to an opening amount so that the intake air amount of the engine 1 becomes the requested amount.

It should be understood that, after the flag F has been set to 1 (i.e. to "increase"), and the target value LT has been changed straight away, when the engine rotational speed stabilizes (YES in step S108), then (in step S109) the flag F is set to 0 (i.e. to "no increase"). When the flag F is set to 0 in this manner, an affirmative decision is made at step S102 and a negative decision comes to be made in step S103, so that normal air intake amount control is resumed (in a step S110).

According to the embodiment described in detail above, the beneficial effects described in the following are obtained.

(I) When the power output request of the engine 1 has increased in a state in which the valve closing timing of the intake valve 9 is before the intake BDC, the target value LT for the maximum lift of the intake valve 9 is changed straight away, without taking into account the actual air amount, to a value which makes the valve closing timing of that valve 9 be a timing which is after the intake BDC and moreover is spaced apart from that BDC. In this case, by drive controlling the variable valve operating mechanism 14 based upon the target value LT, it is possible to make the change of the valve closing timing of the intake valve 9 from before the intake BDC to after the intake BDC be a rapid one, and thereby it is possible to shorten, as much as possible, the time interval M during this process of change over which the valve closing timing of the intake valve 9 is within the range H in the vicinity of the intake BDC. Accordingly, it is possible to ensure that there is no occurrence of knocking during this time interval M, and it is possible to suppress delay of increase of the power output of the engine 1 caused due to retardation of the ignition timing in order to suppress such knocking.

(II) When the target value LT is changed straight away in the manner described above, and the maximum lift of the intake valve 9 is changed according to this target value LT, there is a possibility that the intake air amount of the engine may become excessive. However, when the target value LT is changed straight away as described above, adjustment of the opening amount of the throttle valve 29 is performed to an opening amount region which is more to the closed side than fully open, so that thereby the intake air amount of the engine 1 is brought to the requested amount, and it is possible to ensure that the intake air amount does not become excessive.

It should be understood that the embodiment described above may be changed as described below. That is, although, in the embodiment described above, the decision as to whether the valve closing timing of the intake valve 9 is before the intake BDC, in the step S102 of the intake air amount control routine of FIG. 7, it is decided whether or not the valve closing timing of the intake valve 9 is at a timing which is before 10° before the intake BDC, it would also be acceptable to arrange for this value "10° before intake BDC" to be changed as appropriate.

Figure 7:
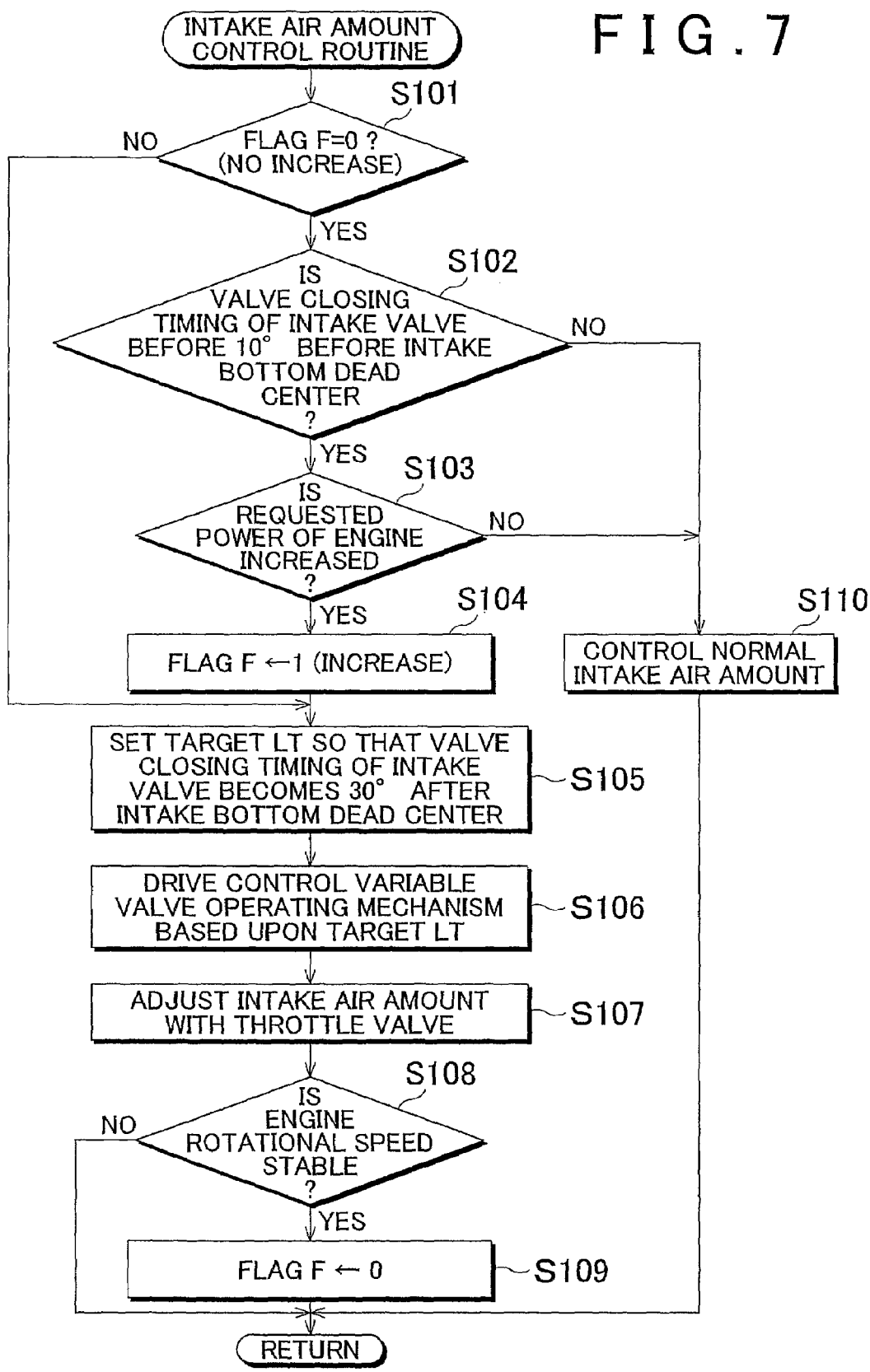
FIG. 7 is a flow chart showing a control procedure for intake air amount.

Furthermore, although in the embodiment described above, in the step S105 of the intake air amount control routine of FIG. 7, as the value when the target value LT is changed straight away so that the valve closing timing of the intake valve 9 is before the intake BDC and, moreover, is a value which is spaced apart from that BDC, a value where the valve closing timing of the intake valve 9 is 30° after the intake BDC was employed, it would also be acceptable to arrange to employ a target value LT which made it become some value other than this value "30° after intake BDC".

While the invention has been described with reference to embodiments thereof, it is to be understood that the invention is not limited to the described embodiments or constructions. To the contrary, the invention is intended to cover various modifications and equivalent arrangements. In addition, while the various elements of the embodiments are shown in various combinations and configurations, which are exemplary, other combinations and configurations, including more, less or only a single element, are also within the spirit and scope of the invention.

The invention claimed is:

1. A control method for an internal combustion engine that suppresses knocking by retarding ignition timing and adjusts an intake air amount by controlling a variable valve operating mechanism, which changes a maximum lift and a duration of an intake valve, comprising:
    increasing a target value for the maximum lift and the duration of the intake valve, when increased an output request of the internal combustion engine, based on the amount of the required increased output and an actual air intake amount,
controlling the variable valve operating mechanism to increase the maximum lift and the duration of the intake valve to the target value; and,
    changing the target value straight away, regardless of the actual air intake amount, to value which makes the valve closing timing of the intake valve become a timing which is after the bottom dead center and is spaced away from the bottom dead center, when the request output of the internal combustion engine is increased in a state in which the valve closing timing of the intake valve is before the intake bottom dead center.

2. The control method for an internal combustion engine according to claim 1, further comprising:
    performing an adjustment of the intake air amount of the internal combustion engine by adjusting the opening amount of a throttle valve which is provided to an intake passage of the internal combustion engine, in addition to changing the maximum lift and the duration of the intake valve towards the target value, when the target value is changed straight away to value which makes the valve closing timing of the intake valve become a timing which is spaced away from the intake bottom dead center.

3. A control device for controlling an internal combustion engine that suppresses knocking by retarding ignition timing and adjusts an intake air amount by controlling a variable valve operating mechanism, which changes a maximum lift and a duration of an intake valve; comprising:
    an increasing unit that increases a target value for the maximum lift and the duration of the intake valve, when increased an output request of the internal combustion engine, based on the amount of the required increased output and an actual air intake amount,
    an controlling unit that controls the variable valve operating mechanism to increase the maximum lift and the duration of the intake valve to the target value; and,
    an changing unit that changes the target value straight away, regardless of the actual air intake amount, to value which makes the valve closing timing of the intake valve become a timing which is after the bottom dead center and is spaced away from the bottom dead center, when the request output of the internal combustion engine is increased in a state in which the valve closing timing of the intake valve is before the intake bottom dead center.

4. The control device for controlling an internal combustion engine according to claim 3, further comprising:
    an adjusting unit that performs an adjustment of the intake air amount of the internal combustion engine by adjusting the opening amount of a throttle valve which is provided to an intake passage of the internal combustion engine, in addition to changing the maximum lift and the duration of the intake valve towards the target value, when the target value is changed straight away to value which makes the valve closing timing of the intake valve become a timing which is spaced away from the intake bottom dead center.

5. The control device for controlling an internal combustion engine according to claim 3,
    wherein the target value is changed to the value such that a compression ratio is low enough so that knocking is less likely to occur.

\* \* \* \* \*